US 6,619,834 B2

(12) United States Patent
Krader et al.

(10) Patent No.: US 6,619,834 B2
(45) Date of Patent: Sep. 16, 2003

(54) DEVICE FOR PRODUCING A MIXTURE FROM CHEMICALLY REACTIVE PLASTIC COMPONENTS AND PERMEATED WITH REINFORCEMENT FIBERS

(75) Inventors: Christoph Krader, Maxhütte Haidhof (DE); Wolfgang Söchtig, Germering (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 09/771,955

(22) Filed: Jan. 29, 2001

(65) Prior Publication Data

US 2001/0017816 A1 Aug. 30, 2001

Related U.S. Application Data

(63) Continuation of application No. PCT/EP99/05310, filed on Jul. 24, 1999.

(30) Foreign Application Priority Data

Aug. 1, 1998 (DE) .......................................... 198 34 767

(51) Int. Cl.[7] ................................................. B29B 7/76
(52) U.S. Cl. ........................ 366/162.5; 83/402; 83/676; 83/913
(58) Field of Search ........................... 83/913, 402, 676; 366/150.1, 163.1, 178.1, 162.4, 162.5; 425/82.1, 120, 122, 289, 294, 301

(56) References Cited

U.S. PATENT DOCUMENTS 1,764,202 A * 6/1930 Dreyrus
2,173,789 A * 9/1939 Nikles et al.
2,217,766 A * 10/1940 Neff
2,607,418 A * 8/1952 Hebeler
2,694,448 A * 11/1954 Petersen
2,846,004 A * 8/1958 Fotland
3,693,487 A * 9/1972 Murdock et al.
5,858,416 A * 1/1999 Sochtig et al.

FOREIGN PATENT DOCUMENTS

| DE | 196 18 393 A | 11/1996 |
|----|--------------|---------|
| GB | 1 401 246 A | 7/1975 |
| WO | WO 84 04111 A | 10/1984 |
| WO | WO 93 11288 A | 6/1993 |

* cited by examiner

Primary Examiner—Charles E. Cooley
Assistant Examiner—David Sorkin
(74) Attorney, Agent, or Firm—Henry M. Feiereisen

(57) ABSTRACT

Integrated in the mixing head of a polyurethane apparatus for producing a mixture stream of chemically reactive plastic components, is a cutting arrangement by which natural fibers or fiber strands of soft-elastic and tough consistency can be drawn from a continuous strand and, after cutting into fiber pieces of given length, can be introduced into the mixture stream. The cutting arrangement includes an inner guide tube which receives a fiber strand, drawn from a continuous fiber strand by two feed rollers, and fed via the guide tube and an outer support tube to rotating knife elements. By subjecting the guide tube to a vacuum and applying a compressed gas stream to the end of the outer support tube, the soft-elastic fiber strand is held straight in a manner which is optimal for the cutting process. The cut fiber pieces are introduced together with the gas stream into the mixture stream of chemically reactive plastic components.

13 Claims, 3 Drawing Sheets

DEVICE FOR PRODUCING A MIXTURE FROM CHEMICALLY REACTIVE PLASTIC COMPONENTS AND PERMEATED WITH REINFORCEMENT FIBERS

CROSS-REFERENCES TO RELATED APPLICATIONS

This application is a continuation of prior filed copending PCT International application no. PCT/EP99/05310, filed Jul. 24, 1999.

This application claims the priority of German Patent Application Serial No. 198 34 767.7, filed Aug. 1, 1998, the subject matter of which is incorporated herein by reference.

BACKGROUND OF THE INVENTION

The present invention relates to a device for producing a mixture from chemically reactive plastic components and permeated with reinforcement fibers.

A device of this type is described, for example, in German Pat. No. DE 196 18 393 in which the reinforcement fibers are made of glass fibers or similarly brittle fibers. The fibers are hereby engaged by a pair of feed rollers and drawn from a continuous fiber strand. One of the feed rollers is equipped with one or more blades so that the fibers are subdivided in pieces of given length during passage through the feed rollers. The fiber pieces cut and accelerated with the feed rollers are transported at high velocity through a central channel in the cleaning piston of a polyurethane mixing head into the mixture of chemically reactive plastic components generated in the mixing head. The cutting of the continuous fibers in pieces of given length at extremely high velocity can be implemented by this device only with relatively brittle fibers, such as, e.g. glass fibers, in which the blade impacting transversely upon the fiber strand causes an immediate breaking of the fibers.

As their disposal is problematic, the application of glass fibers becomes increasingly controversial in many technical fields, e.g. interior area of motor vehicles, so that there exists a pressing need to replace the glass fibers by natural fibers, e.g. hemp fibers. Due to the soft-elastic and tough consistency of natural fibers, the cutting mechanism known from German Pat. No. DE 196 18 393 is unsuitable for producing pieces of natural fibers, such as, e.g., hemp fibers, through the required high-velocity process.

It would therefore be desirable and advantageous to provide an improved device for producing a mixture from chemically reactive plastic components and permeated with reinforcement fibers, obviating prior art shortcomings and suitable for integration in a mixing head of a polyurethane apparatus, for drawing fibers with soft-elastic and tough characteristics (natural fibers) at high velocity from a continuous strand and introduction into the mixture stream of chemically reactive plastic components in the mixing head, after the cutting into fiber pieces of random length.

SUMMARY OF THE INVENTION

The present invention provides for a device for producing a mixture from chemically reactive plastic components and permeated with reinforcement fibers, with the device including a mixing head having a mixing chamber receiving chemically reactive plastic components for producing a plastic mixture; an outlet tube disposed downstream of the mixing chamber for receiving the plastic mixture, a cleaning piston reversibly displaceable in the outlet tube and having a central channel, a conveying unit for feeding a strand of natural fibers to the cutting arrangement, and a cutting arrangement including an outer tube which defines an axis and terminates in an outlet port, an inner guide tube receiving the strand of natural fibers and surrounded by the outer tube at formation of a gas supply channel of ring-shaped cross section for conduction of compressed gas, wherein the inner tube and the outer tube are so configured as to form a ring nozzle, with the outer tube extending beyond a lower end of the inner tube for guiding the strand of natural fiber downstream of the ring nozzle, a cutting mechanism having at least one knife element extending transversely to the axis of the outer tube and in shearing contact with an end surface of the outer tube pass when passing by the outlet port, and an exit tube arranged downstream of the knife element in communication with the central channel of the cleaning piston.

In accordance with the present invention, very soft-elastic natural fibers can now be held in optimum manner in straight extension through application of a vacuum in the entry zone and through feed to the cutting edges in a compressed gas stream, so that the cut nature fiber pieces can be fed, like cut glass fiber components, together with the compressed gas stream in targeted manner to the mixture stream of chemically reactive plastic components.

According to another feature of the present invention, the mixing head includes a housing and a dip tube which is securely fixed to the housing, said dip tube traversing the central channel of the cleaning piston and communicating with the exit tube. Suitably, the dip tube is securely fixed to the exit tube.

According to another feature of the present invention, the knife element includes a knife disk which is driven about an axis in parallel relationship to the axis of the outer tube and has at least one kidney-shaped through-opening having at least one rounded area forming a cutting edge.

The cutting arrangement may include a cutting drum and a retainer ring for replaceably securing the knife element to the cutting drum, whereby the cutting drum has a central opening expanding conically upwards to the through-opening of the knife disk and tapering downwards to an opening terminating in the exit tube. Suitably, the cutting drum is supported in the housing and driven by a drive mechanism supported by the housing and including a toothed belt in driving relationship with the cutting drum, wherein the housing has a cutout for passage of the tooth belt.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
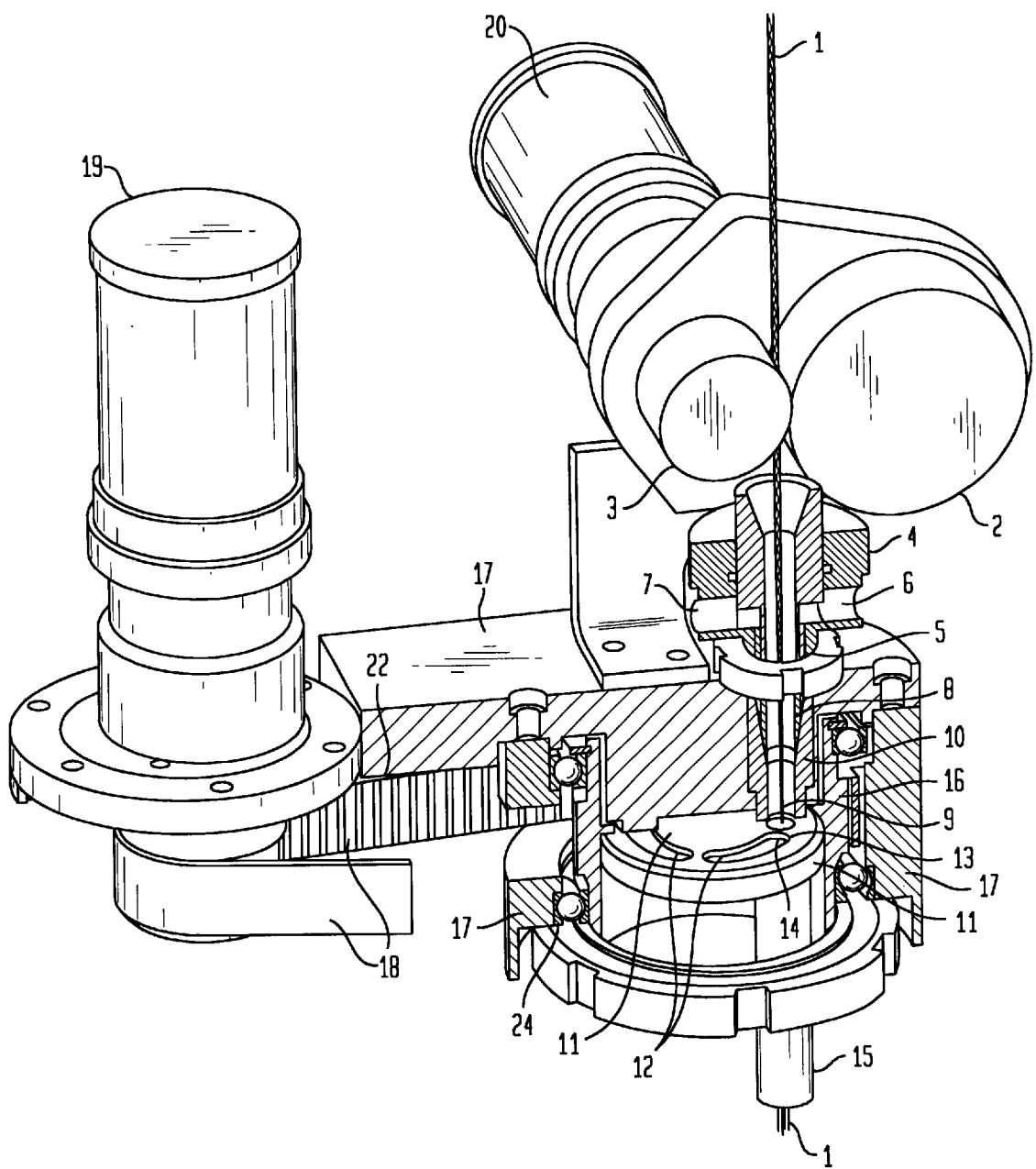
FIG. 1 is a partial sectional, perspective illustration of a device for cutting natural fibers, in accordance with the present invention.

Throughout all the Figures, same or corresponding elements are generally indicated by same reference numerals.

Turning now to the drawing, and in particular to FIG. 1, there is shown a partial sectional illustration of a device for cutting natural fibers in accordance with the present invention. The device includes a multi-part housing 17 having a bore for partially accommodating an inner guide tube 4 for receiving a fiber strand 1 made of natural fibers drawn from a spool (not shown) by a pair of feed rollers 2, 3 which are driven by a drive motor 20. The upper end of the guide tube 4 is funnel-shaped and receives the fiber strand 1 at high velocity from the feed rollers 2, 3. The guide tube 4 has a lower zone which is surrounded by an outer support tube 10 at formation of a gas supply channel 5 of ring-shaped cross section which is supplied with compressed air through inlet openings 6, 7. The outer tube 10 extends beyond a lower end of the inner tube 4 and terminates in an outlet port 9.

The lower zone of the guide tube 4 has an outer surface which is inwardly sloped and interacts with a confronting conical inner surface of the outer tube to thereby define a ring nozzle 8. As compressed air is conducted through the channel 5 via the ring nozzle 7 into the interior area of the outer tube 10, a vacuum is applied in the inner guide tube 4 that draws in the fibers strand. Thus, the combination of the vacuum application in the guide tube 4 and the compressed-air stream in the outer tube 10, a straight configuration of the fiber strand 1 is maintained for subsequent cutting operation. At the same time, the compressed air stream flowing through the ring nozzle 8 tenses the fiber strand 1 in the region of the outer tube 10 up to area of the outlet port 9.

Disposed immediately adjacent the outlet port 9 of the outer tube 10 is a cutting arrangement which includes a knife disk 11 in shearing contact with the outlet port 9. The knife disk 11 is exchangeably secured in a cutting drum 16 which is rotatably supported via ball bearings 21 in the housing 17, for rotation about an axis in parallel relationship to an axis of the guide tube 4. The cutting drum 16 is driven via a toothed belt 18 by a drive motor 19, whereby the housing 17 is formed with a suitable cutout 22 for passage of the toothed belt 18.

The knife disk 11 is formed with two kidney-shaped recesses 12 in spaced-apart relationship to define webs 13 therebetween. The edges of the webs 13 between the recesses 12 form cutting edges 14 by which the fiber strand 1 is sheared off in conjunction with the edges of the outlet port 9 that also act as cutting edges. The compressed gas stream carries the sheared-off partial pieces of the fiber stand 1 to an exit tube 15.

The length of the partial pieces of the fiber strand 1 depends hereby on the transport velocity of the fiber strand 1 and the rotational speed of the knife disk 11. The quantity of cut fibers may thus be set via the rotational speed of the feed rollers 2, 3, while the length of the fiber pieces is governed on the basis of the ratio between the transport velocity of the fiber strand 1 and the rotational speed of the knife disk 11. Length and quantity of the fiber pieces can thus be infinitely varied in almost any manner.

Figure 2:
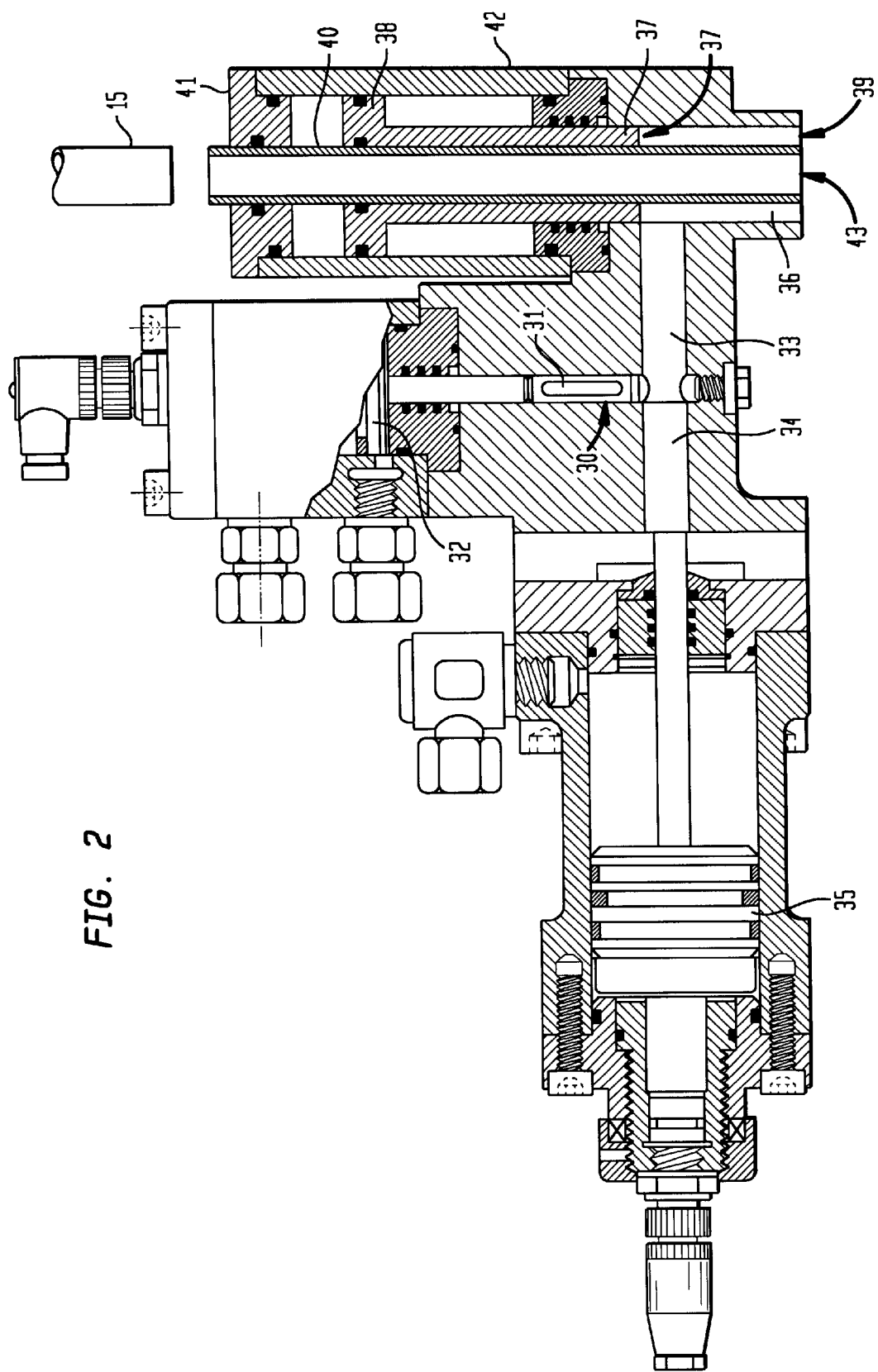
FIG. 2 is a sectional side view of a mixing head of a polyurethane apparatus, for attachment of the device of FIG. 1.

Turning now to FIG. 2, there is shown a sectional side view of a mixing head of a polyurethane apparatus, for attachment of the cutting device shown in FIG. 1. For ease of illustration, only exit tube 15 of the cutting device is shown in FIG. 2. The mixing head is provided to combine chemically reactive plastic components, such as polyol and isocyanate, to form a mixture of flowable plastic. A specific construction and manner in which the mixing head is operatively is fully described in German Pat. No. DE 196 18 393, the entire specification and drawings of which are expressly incorporated herein by reference.

The interface between the cutting device of FIG. 1 with the mixing head of FIG. 2 is effected by a dip tube 40 which terminates in a discharge opening 43 and communicates with the exit tube 15. Although not shown in detail, the exit tube 15 may, of course, be securely fixed to the dip tube 40 or form a single-piece unit therewith. The mixing head has a mixing chamber 30 for accommodating a control piston 31 which is reversibly guided in the mixing chamber 30 by a hydraulic piston 32. Extending into the mixing chamber 30 perpendicular to the drawing plane are injection openings (not shown) for introduction of the chemically reactive plastic components. The injector openings are controlled for simultaneous opening and closing by the control piston 31 which also fulfills the function to expel the reaction mixture, formed in the mixing chamber 30 from the reactive plastic components, from the mixing chamber 30 and to clean the walls of the mixing chamber 30 from the reaction mixture.

Disposed at a right angle to the mixing chamber 30 is a calming chamber 33 in which a first cleaning piston 34 is reversibly guided. The first cleaning piston 34 is actuatable by means of a second hydraulic piston 35. Connected to the calming chamber 33 at a right angle thereto is an outlet tube 36 in which a second cleaning piston 37 is reversibly guided. The second cleaning piston 37 is actuatable by means of a third hydraulic piston 38. The outlet tube 36 terminates in a discharge opening 39 which communicates with the cavity of an injection mold (not shown). The second cleaning piston 37 and the third hydraulic piston 38 are centrally traversed by the dip tube 40 which is secured in the cylinder lid 41 of the hydraulic cylinder 42.

Filling material can be introduced from outside through the dip tube 40 directly via the discharge opening 43 into the reaction mixture flowing from the outlet tube 36.

The dip tube 40 forms the central channel through which the natural fibers, cut to given length, can be fed into the center of the stream of reactive plastic mixture. The dip tube 40 and the exit tube 15, respectively, can be randomly adjusted by an adjustment unit (not shown) translationally with respect to the outlet tube 36 and/or the cleaning piston 37, so that the discharge opening 43 of the dip tube 40 can occupy any position between the position shown in FIG. 2 and a position in which the discharge opening 43 is, for example, flush with an end surface 37a of the cleaning piston 37.

Figure 3:
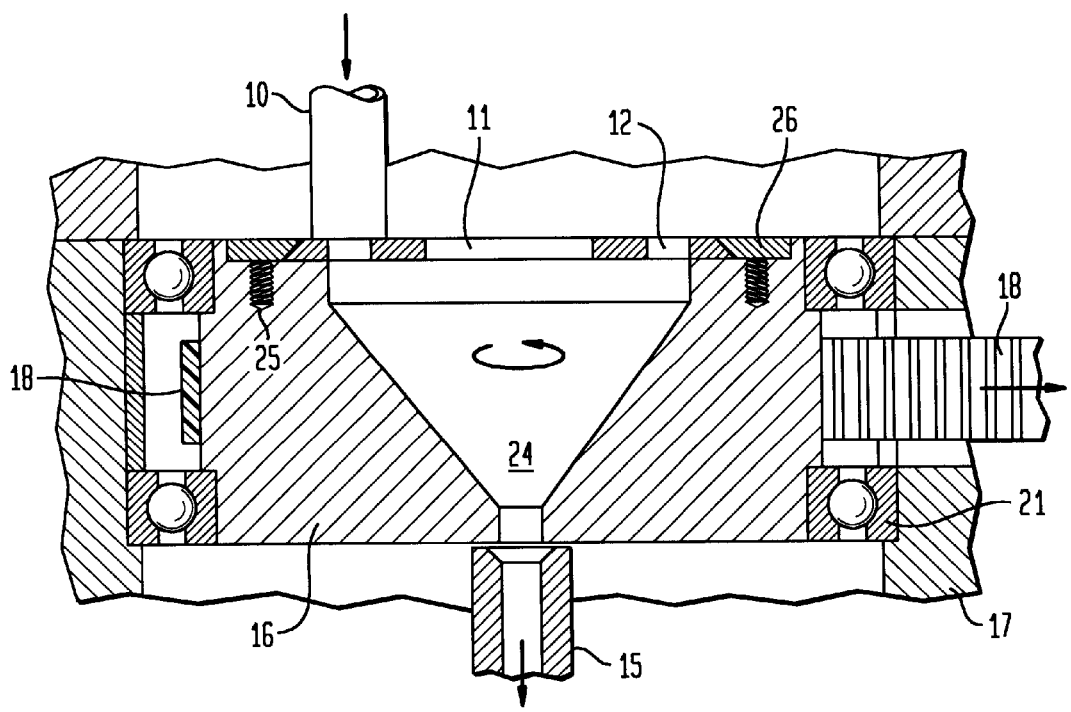
FIG. 3 is a sectional view of another embodiment of a device for cutting natural fibers, in accordance with the present invention.

FIG. 3 shows another embodiment of a cutting device for attachment to a mixing head, as shown in FIG. 2. Parts corresponding with those in FIG. 1 are denoted by identical reference numerals and not explained again. In this embodiment, the outer support tube 10 and the exit tube 15 are not arranged in alignment with one another, as shown in FIG. 1, but in offset parallel disposition. The cutting drum 16 is provided with a central funnel-shaped opening 24 which is in communication with the openings 12 of the knife disk and tapers downwards toward the exit tube 15 so that fiber pieces cut from the fiber strand 1 by the knife disk 12 drop via the opening 24 into the exit tube 15.

The knife disk 11 is secured to the cutting drum 16 by a retaining ring 26 which is fixed by screws 25 for easy replacement of the knife disk 11.

While the invention has been illustrated and described as embodied in a device for producing plastic articles with reinforcement fibers, it is not intended to be limited to the details shown since various modifications and structural changes may be made without departing in any way from the spirit of the present invention.

What is claimed as new and desired to be protected by Letters Patent is set forth in the appended claims:

1. A device for producing a mixture from chemically reactive plastic components and permeated with reinforcement fibers, comprising:
   a mixing head having a mixing chamber receiving chemically reactive plastic components for producing a plastic mixture;
   an outlet tube disposed downstream of the mixing chamber for receiving the plastic mixture;
   a cleaning piston reversibly displaceable in the outlet tube and having a central channel;
   a conveying unit for feeding a strand of natural fibers; and
   a cutting arrangement including an outer tube defining an axis and terminating in an outlet port, an inner guide tube receiving the strand of natural fibers from the conveying unit and surrounded by the outer tube at formation of a gas supply channel of ring-shaped cross section for conduction of compressed gas, the inner tube and the outer tube so configured as to form a ring nozzle, with the outer tube extending beyond a lower end of the inner tube for guiding the strand of natural fiber downstream of the ring nozzle, and a cutting mechanism having at least one knife element extending transversely to the axis of the outer tube and in shearing contact with an end surface of the outer tube when passing by the outlet port, and an exit tube arranged downstream of the knife element in communication with the central channel of the cleaning piston, wherein the knife element includes a knife disk which is driven about an axis in parallel relationship to the axis of the outer tube and has at least one kidney-shaped through-opening having at least one rounded area forming a cutting edge.

2. The device of claim 1, wherein the mixing head includes a housing and a dip tube which is securely fixed to the housing, said dip tube traversing the central channel of the cleaning piston and communicating with the exit tube.

3. The device of claim 2, wherein the dip tube is securely fixed to the exit tube.

4. The device of claim 1, wherein the cutting arrangement includes a cutting drum and a retainer ring for replaceably securing the knife element to the cutting drum, said cutting drum having a central opening expanding conically upwards to the through-opening of the knife disk and tapering downwards to an opening terminating in the exit tube.

5. The device of claim 4, wherein the cutting arrangement has a housing and a drive mechanism supported by the housing and including a toothed belt in driving relationship with the cutting drum, said cutting drum supported in the housing which has a cutout for passage of the tooth belt.

6. In combination:
   a cutting arrangement for guiding a fiber strand and cutting pieces from the fiber strand;
   a mixing head receiving the fiber pieces from the cutting arrangement and combining the fiber pieces with a mixture from chemically reactive plastic components,
   wherein the cutting arrangement includes an outer tube defining an axis and terminating in an outlet port, an inner guide tube receiving the fiber strand and surrounded by the cuter tube at formation of a gas supply channel of ring-shaped cross section for conduction of compressed gas, the inner tube and the outer tube so configured as to form a ring nozzle, with the outer tube extending beyond a lower end of the inner tube for guiding the fiber strand downstream of the ring nozzle, and a cutting mechanism having at least one knife element extending transversely to the axis of the outer tube and in shearing contact with an end surface of the outer tube pass when passing by the outlet port,
   wherein the knife element includes a knife disk which is driven about an axis in parallel relationship to the axis of the outer tube and has at least one kidney-shaped through-opening having at least one rounded area forming a cutting edge.

7. The combination of claim 6, wherein the mixing head includes a housing and a dip tube which is securely fixed to the housing, said dip tube received in a cleaning piston and communicating with an exit tube.

8. The combination of claim 7, wherein the dip tube of the mixing head is securely fixed to the exit tube.

9. The combination of claim 6, wherein the cutting arrangement includes a cutting drum and a retainer ring for replaceably securing the knife element to the cutting drum, said cutting drum having a central opening expanding conically upwards to the through-opening of the knife disk and tapering downwards to an opening which terminates in the exit tube.

10. The combination of claim 9, wherein the cutting arrangement has a housing and a drive mechanism supported by the housing and including a toothed belt in driving relationship with the cutting drum, said cutting drum supported in the housing which has a cutout for passage of the tooth belt.

11. A cutting device for attachment to a mixing head of a polyurethane apparatus, said cutting device comprising:
    an inner tube and an outer tube defining an axis;
    means for conducting a stream of compressed gas through a channel between the inner and outer tubes and into an interior of the outer tube thereby applying a vacuum in the inner tube for drawing a fiber strand and aligning the fiber strand in a straight configuration; and
    a cutting mechanism having at least one knife element extending adjacent a lower end of the outer tube transversely to the axis so as to be in shearing contact with an end surface of the outer tube as the knife element passes by, wherein the knife element includes a knife disk which rotates about an axis in parallel relationship to the outer tube and has at least one kidney-shaped through-opening having at least one rounded area forming a cutting edge for cutting the fiber strand as it passes the knife disk.

12. The cutting device of claim 11, wherein the cutting arrangement includes a cutting drum and a retainer ring for replaceably securing the knife element to the cutting drum, said cutting drum having a central opening expanding conically upwards to the through-opening of the knife disk and tapering downwards to an opening terminating in the exit tube.

13. The cutting device of claim 12, wherein the cutting arrangement has a housing and a drive mechanism supported by the housing and including a toothed belt in driving relationship with the cutting drum, said cutting drum supported in the housing which has a cutout for passage of the tooth belt.

* * * * *